(12) United States Patent  
Fratti et al.

(10) Patent No.: US 8,054,415 B2
(45) Date of Patent: Nov. 8, 2011

(54) LED LCD BACKLIGHT WITH LENS STRUCTURE

(75) Inventors: Roger Fratti, Mohnton, PA (US); Kouros Azimi, Center Valley, PA (US); Mohammad Mobin, Orefield, PA (US); Ian Hughes, Malvern, PA (US)

(73) Assignee: LSI Corporation, Milpitas, CA (US)

( * ) Notice: Subject to any disclaimer, the term of this patent is extended or adjusted under 35 U.S.C. 154(b) by 227 days.

(21) Appl. No.: 12/546,031

(22) Filed: Aug. 24, 2009

(65) Prior Publication Data

US 2011/0043725 A1 Feb. 24, 2011

(51) Int. Cl.
G02F 1/1335 (2006.01)
G09F 13/08 (2006.01)

(52) U.S. Cl. .............................. 349/95; 349/62; 362/97.3

(58) Field of Classification Search ................. 362/97.3; 349/61–69, 95
See application file for complete search history.

(56) References Cited

U.S. PATENT DOCUMENTS

2002/0085143 A1* 7/2002 Kim et al. .................. 349/61
2007/0291204 A1* 12/2007 Otake ......................... 349/114
2009/0174837 A1* 7/2009 Chang et al. ............... 349/62

* cited by examiner

*Primary Examiner* — Mark Robinson
*Assistant Examiner* — Michael Inadomi

(57) ABSTRACT

In described embodiments, a thin film transistor (TFT) liquid crystal display (LCD) structure incorporates a white light emitting diode (LED) structure for backlighting. White LEDs are formed behind each TFT cell, allowing for display "black" as a function of a nematic layer, on the TFT substrate, while increasing intensity of the LED LCD backlight structure. A lens structure might be formed between the LEDs and the TFT substrate to reduce a number of LED sources for a given backlight intensity.

11 Claims, 3 Drawing Sheets

300

400

500

503(2)

LED LCD BACKLIGHT WITH LENS STRUCTURE

BACKGROUND OF THE INVENTION

1. Field of the Invention

The present invention relates to thin film transistor (TFT) liquid crystal display (LCD) structures, and, in particular, to a TFT LCD incorporating an LED structure for backlighting.

2. Description of the Related Art

A thin film transistor liquid crystal display is a variant of a liquid crystal display (LCD) which uses thin film transistor (TFT) technology. A TFT LCD is one type of active matrix LCD, and TFT LCDs are used in many different types of consumer electronic devices, such as television sets, computer monitors, mobile phonies, handheld video game systems, personal digital assistants, navigation systems, and projectors. In TFT LCDs, pixels are addressed in rows and columns, and each pixel is provided with its own transistor switch that allows each pixel to be individually controlled. The low leakage current of the transistor prevents the voltage applied to the pixel from leaking away between refreshes to the display image. Each pixel is a small capacitor with a layer of insulating liquid crystal sandwiched between transparent conductive Indium Tin Oxide (ITO) layers.

The circuit layout of a TFT LCD is very similar to that of a DRAM memory. However, rather than fabricating the transistors from silicon formed into a crystalline wafer, they are made from a thin film of silicon deposited on a glass panel. Transistors take up only a small fraction of the area of each pixel; the rest of the silicon film is etched away to allow light to pass through. The silicon layer for TFT LCDs is typically deposited using the Plasma Enhanced Chemical Vapor Deposition (PE CVD) process from a silane gas precursor to produce an amorphous silicon film. Polycrystalline silicon is sometimes used in displays requiring higher TFT performance. Examples include high-resolution displays, high-frequency displays or displays where performing some data processing on the display itself is desirable. Amorphous silicon-based TFTs have the lowest performance, polycrystalline silicon TFTs have higher performance (notably mobility), and single-crystal silicon transistors have the best performance.

FIG. 1 shows a top view of a conventional prior art LCD array 101 employed for a TFT LCD display. Each square, such as square 102, represents a TFT LCD cell with its associated charging capacitor, switching transistor, and biasing elements. In addition, a large number of TFT LCD displays employ backlighting. Backlighting provides a light source to provide brightness from the rear of the display panel, which light source generally includes an array of individual light sources dispersed through arrays of the panel. In some applications, backlighting might be accomplished through use of an array of light emitting diodes (LEDs), but in most applications backlighting is accomplished through an array of cold cathode fluorescent lights (CCFLs). CCFLs require high voltages to fluoresce, which voltages are achieved using switching boost regulators. Consequently, FIG. 1 also shows CCFL arrays 103 and 104, illustrating placement of CCFLs, such as CCFL 105, along the edges of a TFT LCD array to provide backlighting. FIG. 2 shows an edge view of the TFT LCD array of FIG. 1. As shown) in FIG. 2, Si substrate 201 includes array 202 of TFT LCD cells 203(1) through 203(N) grown on substrate 201 by known techniques. Above Si substrate 201 is liquid crystal (LC) layer 204 including a twisted nematic (TN) layer, polarizer (electrode) and color filter. LC layer 204 is covered by glass panel 205. Dashed lines in FIG. 2 are meant to show regions of the device corresponding to TFT LCD cells 203(1) through 203(N) when formed during the manufacturing process by patterning electrodes above and below LC layer 204.

The inexpensive TN display is the most common display type used in consumer electronics. The TN effect is based on the precisely controlled realignment of liquid crystal molecules between different ordered molecular configurations under the action of an applied electric field. A twisted configuration of nematic liquid crystal molecules (e.g., within LC layer 204) is formed between two glass plates (Si substrate 201 and glass panel 205), which are separated by several spacers and coated with transparent electrodes. The electrodes themselves are coated with alignment layers that precisely twist the liquid crystal 90° when no external field is present. When light is incident on one side of the panel, which behaves as transparent to the wavelengths of light concerned, the light having proper polarization passes through the first polarizer and into the crystal. Light in the crystal is rotated by the helical structure. The light is then properly polarized to pass through the second polarizer, set at 90° to the first. The rotated light then passes through the other side of the LCD cell, which also behaves as transparent to the wavelengths of the light concerned.

When a field is applied between the two electrodes, the crystal re-aligns itself with the external field, breaking the twist in the crystal, Without the twist, the polarized light passing through the crystal fails to re-orient. In this case the light is blocked by the real polarizer, and the cell becomes opaque. The amount of opacity is controlled by varying the voltage applied between the two electrodes; at voltages near a threshold only some of the crystals will re-align, and the display will be partially transparent, but as the voltage is increased more and more of the crystals will re-align until it becomes completely switched. To display information with a twisted nematic liquid crystal, the transparent electrodes are structured by photo-lithography to form a matrix or other pattern of electrodes. Only one of the electrodes has to be patterned in this way, the other can remain continuous.

SUMMARY OF THE INVENTION

This Summary is provided to introduce a selection of concepts in a simplified form which are further described below in the Detailed Description. This Summary is not intended to identify key features or essential features of the claimed subject matter, nor is it intended to be used to limit the scope of the claimed subject matter.

In one embodiment, the present invention allows for display backlight employing a substrate, the substrate having a plurality of thin film transistor (TFT) cells formed on a top surface of the substrate, and a plurality of light emitting diode (LED) sources formed on a bottom surface of the substrate. Each of the plurality of LED sources is positioned so as to emit light from the LED toward and through the top surface of the substrate and through one or more corresponding ones of the plurality of TFT cells.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In described embodiments, a thin film transistor (TFT) liquid crystal display (LCD) structure incorporates a white light emitting diode (LED) structure for backlighting. White LEDs are formed behind each TFT cell of the LCD structure, allowing for display "black" as a function of a nematic layer on the TFT substrate, while increasing intensity of the TFT LCD backlighting. A lens structure might be formed between each LED and the TFT substrate to reduce a number of LED sources for a given backlight intensity. A TFT LCD display having a white LED backlight structure in accordance with exemplary embodiments of the present invention might provide the advantages of i) increased backlight intensity with lower power and/or voltage requirements, and ii) simplified circuitry by reduction or elimination of switching boost regulators and cold cathode fluorescent lights (CCFLs).

Figure 1:
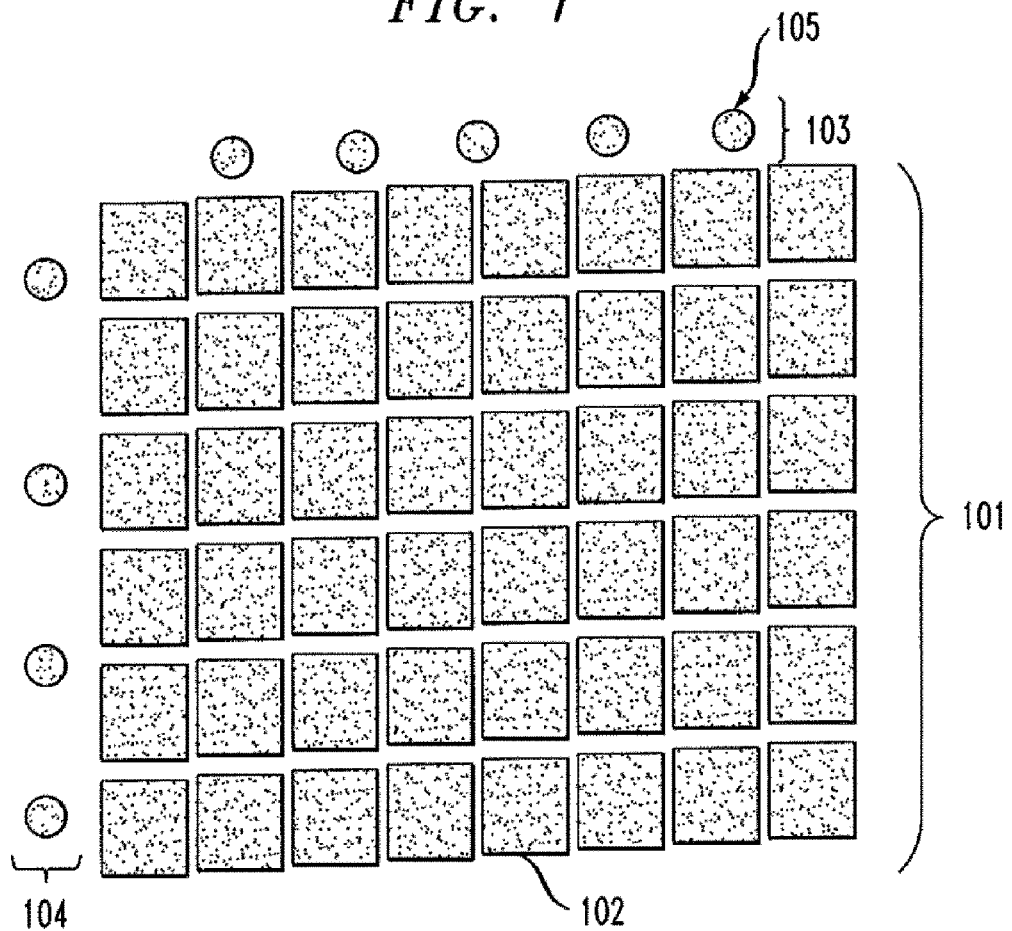
FIG. 1 shows a conventional prior art LCD array employed for a TFT LCD display.
Figure 2:
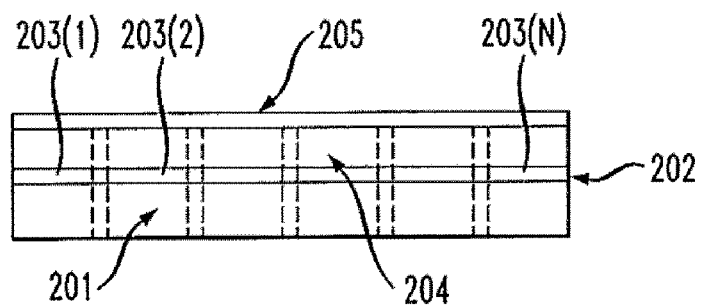
FIG. 2 shows an edge view of the prior art TFT LCD array of FIG. 1.
Figure 3:
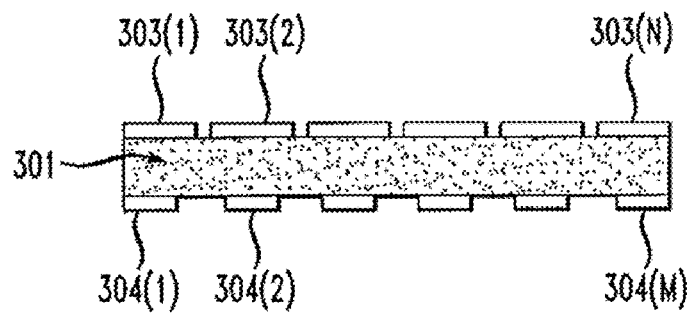
FIG. 3 shows all edge view of a TFT LCD array having a white LED backlight structure in accordance with a first exemplary embodiment of die present invention.

FIG. 3 shows an edge view of a partial TFT LCD array device 300 having a white LED backlight structure in accordance with a first exemplary embodiment of the present invention. Array device 300 is shown with TFT LCD cells 303(1) through 303(N) grown on a top surface of substrate 301, such as a Si substrate, by known techniques. Also shown in FIG. 3 are white LED sources 304(1) through 304(M) generally positioned on a bottom surface of substrate 301 opposite to corresponding ones of TFT LCD cells 303(1) through 303(N), in accordance with a first exemplary embodiment of the present invention. The amount of light that passes through the TN TFT cell is based on the polarization.

When white LED source light is generated, the light is incident on the one side of an LCD panel (toward TFT LCD cells 303(1) through 303(N)), which behaves as transparent to the wavelengths of light concerned, the white LED source light having proper polarization passes through the first polarizer and into the crystal. Light in the crystal is rotated based on control bias voltage, thereby being polarized to some desired extent. Based on the pass through the second polarizer, set at 90° to the first, the rotated light passes to the other side of the LCD cell and through the glass panel, which also behaves as transparent to the wavelengths of light concerned.

As employed herein, the terms "top" and "bottom" surfaces are merely employed as a convenience to the reader to facilitate all understanding of the invention. Also, although the number, N, of TFT LCD cells might be equivalent to the number, M, of white LED sources, this is not a requirement of the present invention. More or less white LED sources than the number of TFT LCD cells might be employed for a given design or implementation, with the number of white LED sources determined as a tradeoff between backlight intensity and power consumption for the overall device.

While not explicitly shown in the figures, a particular implementation might form conductors and/or electrodes and other circuitry to activate and operate white LED sources 304(1) through 304(N). Such conductors and/or electrodes and other circuitry might be of a material selected for its transmissivity characteristics, and these might be formed in a material that is generally transparent to light at the wavelengths of light concerned. For the exemplary embodiment of FIG. 3, each of white LED sources 304(1) through 304(N) might be formed with a geometry or size smaller than that of each corresponding one of TFT LCD cells 303(1) through 303(N) to reduce interference with light incident on the TFT LCD cells 303(1) through 303(N), although white LED sources 304(1) through 304(N) also might be formed in a material that is generally transparent to light at the wavelengths of light concerned. Such selection might be made when a rear of the display panel is mirrored to collect and reflect stray light back through the front of the display panel.

As would be apparent to one skilled in the art, array device 300 is only partially shown in FIG. 3 to illustrate the particular features of an embodiment of the present invention. The liquid crystal (LC) layer including twisted nematic (TN) layer, polarizer, color filter, electrodes/conductors, and top glass panel are not shown, but might be implemented by any number of techniques employed in the art of LCD panel design. As shown in the FIG. 3, in accordance with embodiments of the present invention, white LEDs are fabricated on the bottom of the substrate below each TFT cell, allowing for individual lighting of each TFT cell. "Black" for the exemplary TFT LCD display is a function of i) transmissivity of its nematic layer (when appropriately biased) and ii) brightness of the white LED.

Figure 4:
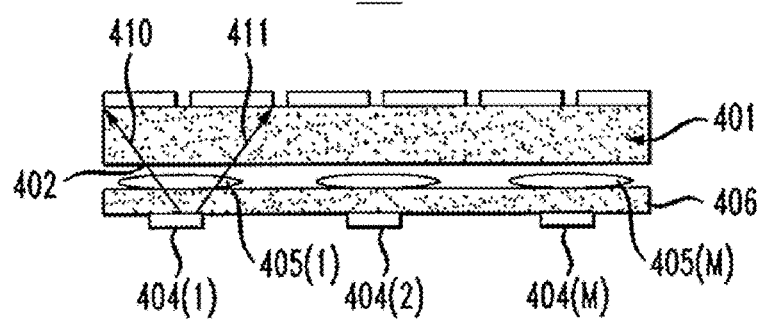
FIG. 4 shows an edge view of the TFT LCD array incorporating a lens structure between a white LED and two or more TFT cells in accordance with a second exemplary embodiment of the present invention.

FIG. 4 shows a partial TFT LCD array device 400, similar to the partial TFT LCD array device 300 as shown in FIG. 3, but incorporating lens structure 402 having lenses 405(1) through 405(M) formed between white LED sources 404(1) through 404(M) and corresponding ones of TFT LCD cells 403(1) through 403(N) in accordance with a second exemplary embodiment of the present invention. In a similar manner to that described with respect to FIG. 3, array device 400 is shown with TFT LCD cells 403(1) through 403(N) grown on a top surface of first substrate 401, such as a Si substrate, by known techniques. A backlight assembly is then grown or fastened to the bottom surface of first substrate 401. The backlight assembly comprises lens focal structure 402 with lenses 405(1) through 405(M), second substrate 406, and white LED sources 404(1) through 404(M). Lens focal structure 402 includes a transparent material deposited on the bottom surface of substrate 402 to a predetermined thickness as described subsequently. White LED sources 404(1) through 404(M) are grown or fastened to a bottom surface of second substrate 406. Lenses 405(1) through 405(M) are formed in lens focal structure 402 and are grown or fastened to a top surface of second substrate 406 in a position generally opposite to corresponding ones of white LED sources 404(1) through 404(M). In turn, lens structure 402 of the backlight assembly is positioned at the bottom surface of first substrate 401 in such a manner to center each of lenses 405(1) through 405(M) below a group of corresponding ones of TFT LCD cells 403(1) through 403(N).

As shown in the FIG. 4, in accordance with embodiments of the present invention, a lens might be fabricated between i) white LEDs on the substrate below TFT cells and ii) the TFT cells themselves. The embodiment shown in FIG. 4 allows for lighting of two or more TFT cells by a single white LED to allow for fewer white LED back light sources. Such embodiment might provide slightly less resolution but use significantly less power. Dispersive focusing of white LED light is illustrated by the area between lines 410 and 411 of FIG. 4.

To focus each of lenses 405(1) through 405(M) in such manner to obtain light within the area between lines 410 and 411 of FIG. 4, a focal distance is predetermined based on i) the concavity or convexity of the surfaces of the lens (e.g., lens 405(m)); ii) the dispersive characteristics of the materials of focal structure 402, first substrate 401, and second substrate 406; and iii) the surface area/location of the TFT LCD cells that are desirably subject to light incident from the white LED. The predetermined focal distance sets the distance between a top surface of a white LED and the bottom surface of a TFT LCD cell. This distance comprises the thickness of first substrate 401, second substrate 406 and a thickness of lens structure 402 including the thickness of the lens of interest. Focusing of the lenses might be accomplished in production by maintaining a tight tolerance of the thickness of first substrate 401 and second substrate 406, while either controllably growing or etching/polishing a top and/or bottom surface of focal structure 402.

Figure 5:
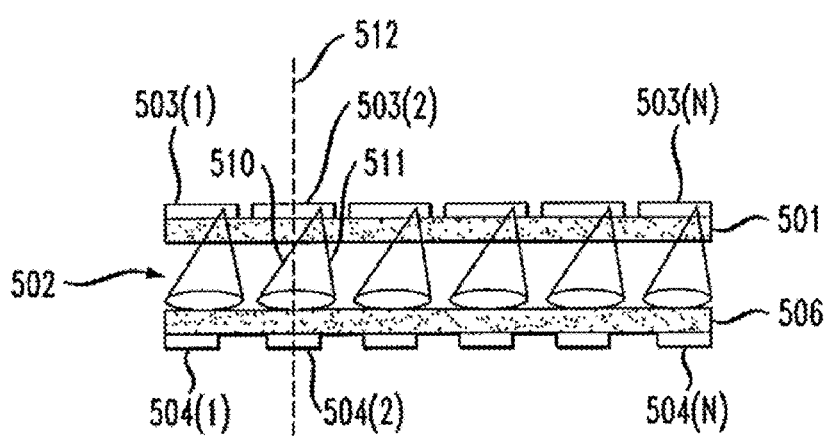
FIG. 5 shows an edge view of the TFT LCD array incorporating a lens structure between a white LED and a single TFT cell in accordance with a third exemplary embodiment of the present invention.

FIG. 5 shows an edge view of partial TFT LCD array device 500 incorporating lens structure 502 between a white LED and a single TFT cell in accordance with a third exemplary embodiment of the present invention. Lens focal structure 502 comprises lenses 505(1) through 505(N) between white LED sources 504(1) through 504(N) and corresponding ones of TFT LCD cells 403(1) through 403(N) in accordance with the third exemplary embodiment. In a similar manner to that described with respect to FIGS. 3 and 4, array device 500 is shown with TFT LCD cells 503(1) through 503(N) grown on a top surface of first substrate 501, such as a Si substrate, by known techniques. A backlight assembly is then grown or fastened to the bottom surface of first substrate 501. The backlight assembly comprises lens focal structure 502 with lenses 505(1) through 505(N), second substrate 506, and white LED sources 504(1) through 504(N).

Lens focal structure 502 includes a transparent material deposited on the bottom surface of substrate 501 to a predetermined thickness based on focusing light to a predefined focal point, such as described previously with respect to FIG. 4. White LED sources 504(1) through 504(N) are grown or fastened to a bottom surface of second substrate 506. Lenses 505(1) through 505(N) are formed in lens focal structure 502 and are grown or fastened to a top surface of second substrate 506 in a position generally opposite to corresponding ones of white LED sources 504(1) through 504(N). In turn, lens structure 502 of the backlight assembly is positioned at the bottom surface of first substrate 501.

As shown in the FIG. 5, in accordance with embodiments of the present invention, a lens might be fabricated between i) a single white LED on the substrate below a corresponding TFT cell and ii) the corresponding TFT cell itself. The embodiment shown in FIG. 5 is similar to that for lighting of two or more TFT cells by a single white LED as shown in the second exemplary embodiment of FIG. 4. However, in the third exemplary embodiment of FIG. 5, white LED light is focused to a focal point selected within a predetermined area of the corresponding TFT cell. Such focus of white LED light is illustrated in FIG. 5 by the intersection of lines 510 and 511 at a point to the right of center axis 512 of TFT cell 503(2). Such focus of white LED light illustrated in FIG. 5 is exemplary and one skilled in the art might select a given location based on design concerns for a given implementation.

While the second embodiment shown in FIG. 4 allows for lighting of two or more TFT cells by a single white LED, the third embodiment of FIG. 5 employs a lens to focus light from a single white LED at a single TFT cell. Such alternative embodiment might allow for i) focusing light into the TFT cell for higher intensity to counter effects of dispersion, and ii) focusing light into the TFT cell at specific locations around the transistor and/or other elements in the TFT cell to, again, provide higher intensity and higher efficiency through reducing losses from reflections caused by LED light incident on elements in the TFT cell.

Figure 6:
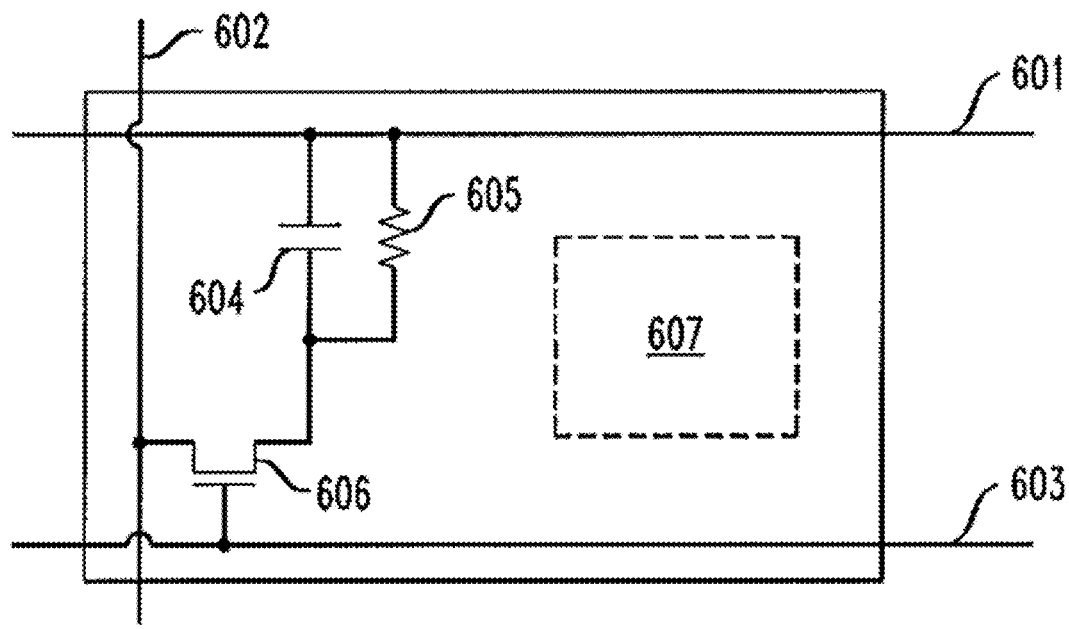
FIG. 6 illustrates a top view of a TFT cell in accordance with the third exemplary embodiment of FIG. 5.

For example, FIG. 6 illustrates a top view of TFT cell 503(2) in accordance with the exemplary embodiment of FIG. 5. Upper (e.g., common) conductor 601, enabling (e.g., data) conductor 602, and lower (e.g., gate) conductor 603 employed in a row-column structure to create a bias voltage for TFT cell operation and are coupled by capacitor 604 which stores a charge, impedance 605 and transistor 606 which acts as the switch for the TFT cell. A white LED and lens structure as described above is positioned behind TFT cell 503(2) that focuses light into the area shown by dashed area 607, that is substantially devoid of active devices such as conductors 601, 602 and 603, capacitor 604, impedance 605 and transistor 606. Conductors 601, 602 and 603, capacitor 604, impedance 605 and transistor 606 might be formed from a material that is relatively transparent to white LED light, but losses might still occur when white LED light is incident on these devices. For example, since material of the conductors/active devices and surrounding material are different, the differences in the index of refraction of the materials at their interface might cause reflection, bending, or dispersion of light passing through their interface. In addition, light energy absorbed by these elements might interfere with their operation. By focusing white LED light to avoid these devices, brighter light, less interference, and less required power might result.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The present invention may be implemented as circuit-based processes, including possible implementation as a single integrated circuit (such as an ASIC or an FPGA), a multi-clip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

Unless explicitly stated otherwise, each numerical value and range should be interpreted as being approximate as if the word "about" or "approximately" preceded the vale of the vale or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

We claim:

1. Apparatus for display backlight, the apparatus comprising:
    a substrate structure comprising a first substrate, a second substrate, and a lens focal structure formed between a bottom surface of the first substrate and a top surface of the second substrate, the substrate structure having a plurality of thin film transistor (TFT) cells formed on a top surface of the substrate structure; and
    a plurality of light emitting diode (LED) sources formed on a bottom surface of the second substrate, each of the plurality of LED sources positioned so as to emit light from the LED toward and through the top surface of the substrate structure and through one or more corresponding ones of the plurality of TFT cells,
    wherein the lens focal structure is configured to focus light emitted from each of the plurality of LED sources toward corresponding ones of the plurality of TFT cells, the lens focal structure further comprises a plurality of lenses, each lens generally positioned above a corresponding one of the plurality of LED sources and below two or more corresponding ones of the plurality of TFT cells, each lens within the lens focal structure configured so as to direct light emitting i) through the lens from the corresponding LED source and ii) through the two or more corresponding ones of the plurality of TFT cells.

2. The invention of claim 1, wherein each lens within the lens focal structure is configured so as to direct light emitting i) through the lens from the corresponding LED source and ii) through the two or more corresponding ones of the plurality of TFT cells at a focal point within the two or more corresponding ones of the plurality of TFT cells, the focal point included in an area of the plurality of TFT cells without active devices.

3. The invention of claim 1, wherein: a focal length of a lens of the lens structure is based on a width of the first substrate and the lens structure.

4. The invention of claim 1, wherein one or more plurality of LED sources is a white LED source.

5. The invention of claim 1, where in the apparatus is embodied in a TFT display.

6. The invention of claim 1, wherein the apparatus is embodied in a semiconductor device.

7. A method of forming a display backlight structure, the method comprising the steps of:
    forming a plurality of thin film transistor (TFT) cells on a top surface of a first substrate of a substrate structure, wherein the substrate structure comprises the first substrate and a second substrate;
    forming a plurality of light emitting diode (LED) sources on a bottom surface of the second substrate, each of the plurality of LED sources positioned so as to emit light from the LED toward and through the top surface of the substrate structure and through one or more corresponding ones of the plurality of TFT cells;
    forming a lens structure between a bottom surface of the first substrate and a top surface of the second substrate; and
    configuring the lens structure so as to focus light emitted from each of the plurality of LED sources toward corresponding ones of the plurality of TFT cells,
    wherein the lens focal structure comprises a plurality of lenses, each lens generally positioned above a corresponding one of the plurality of LED sources and below two or more corresponding ones of the plurality of TFT cells, each lens within the lens focal structure configured so as to direct light emitting i) through the lens from the corresponding LED source and ii) through the two or more corresponding ones of the plurality of TFT cells.

8. The invention of claim 7, wherein each lens within the lens focal structure is configured so as to direct light emitting i) through the lens from the corresponding LED source and ii) through the two or more corresponding ones of the plurality of TFT cells at a focal point within the two or more corresponding ones of the plurality of TFT cells, the focal point included in an area of the plurality of TFT cells without active devices.

9. The invention of claim 7, wherein: a focal length of a lens of the lens structure is based on a width of the first substrate and the lens structure.

10. The invention of claim 7, wherein, for the step of forming the one or more plurality of LED sources, the method forms at least one white LED source.

11. The invention of claim 7, wherein the method is employed as a method of forming a TFT display.

* * * * *